May 12, 1970     L. T. FULLER     3,511,523
SEMI-ENCLOSING SEAL MEANS FOR FIFTH WHEEL
Filed June 21, 1968
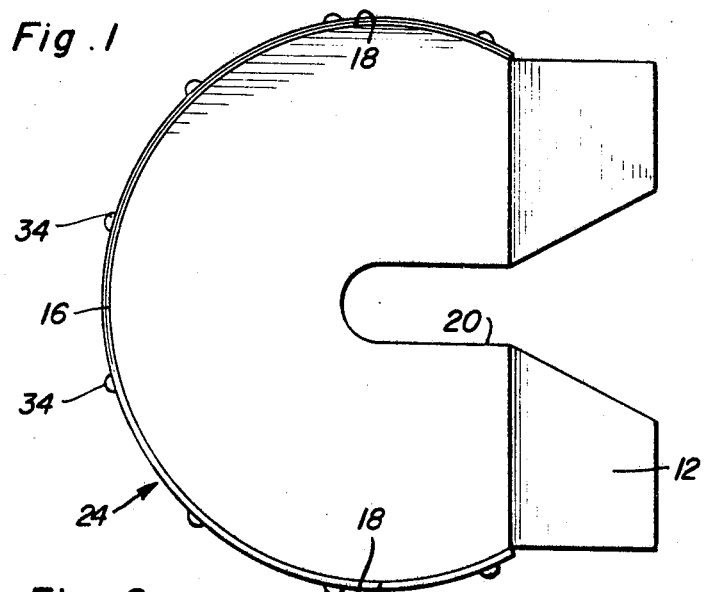
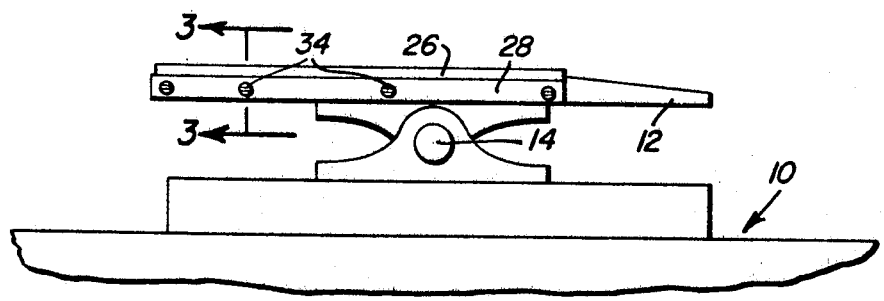
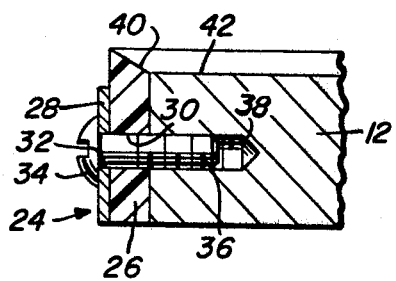
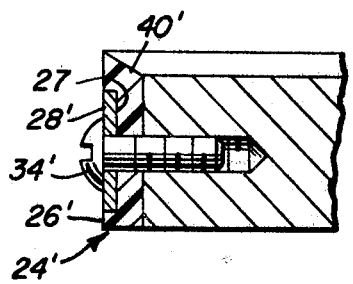
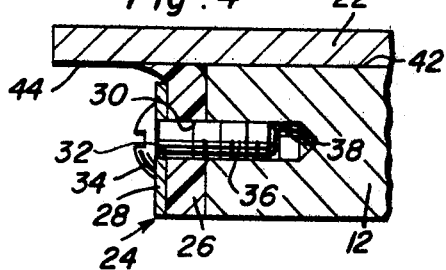
Leslie T. Fuller
INVENTOR.
BY *Clarence A. O'Brien*
and *Harvey B. Jacobson*
Attorneys

United States Patent Office 3,511,523
Patented May 12, 1970

3,511,523
SEMI-ENCLOSING SEAL MEANS FOR FIFTH WHEEL
Leslie T. Fuller, Hermleigh, Tex.
(P.O. Box 640, Colorado City, Tex. 79512)
Filed June 21, 1968, Ser. No. 738,902
Int. Cl. B62d *53/08*
U.S. Cl. 280—433                    8 Claims

ABSTRACT OF THE DISCLOSURE

A seal forming attachment for a fifth wheel of the type operable, in conjunction with an associated fifth wheel pin, to pivotally couple a semi-trailer to a tractor The attachment includes an elongated resilient seal structure adapted to be secured about and to extend slightly above the forward and opposite side marginal edge portions of a fifth wheel for fluid-tight sealed engagement with the undersurface of the kingpin plate on the associated semi-trailer as the tractor is advanced rearwardly beneath the forward end of the semi-trailer.

---

The seal means or attachment for a fifth wheel body or plate is constructed in a manner whereby it may be readily attached to existing fifth wheel plates or incorporated into the manufacture of new fifth wheel plates. An elongated strip of resilient seal material, such as neoprene, is provided and secured about the forward and opposite side upstanding edge portions of the associated fifth wheel plate with the uppermost edge portion of the neoprene strip projecting slightly above the upper surface of the fifth wheel plate and beveled upwardly and outwardly so as to be adapted to be outwardly flexed and thus inherently biased into relatively tight sealed engagement with the undersurface of the associated kingpin plate when the latter is disposed over and rests upon the upper surface of the fifth wheel plate.

Although the seal forming attachment of the instant invention illustrated and described hereinafter is secured to the upstanding marginal surfaces of the associated fifth wheel plate, it is to be noted that the upper surface of the plate could be grooved adjacent its peripheral portions with a seal strip similar to the seal strip illustrated and described hereinafter seated in the groove.

It has been found that the presence of dirt and moisture between the upper surface of a fifth wheel plate and the opposing undersurface of a kingpin plate of an associated trailer results in excessive wear of the opposing bearing surfaces defined by the fifth wheel plate and the kingpin plate with the result that the pivot connection established between the fifth wheel and the fifth wheel pin or kingpin becomes sloppy and thus enables greater shock loads to be transmitted from the associated tractor to the semi-trailer and vice versa.

It is accordingly the main object of this invention to provide seal means for a fifth wheel plate which will be operative to form a relatively tight fluid seal between the fifth wheel plate and an associated kingpin plate extending about at least the front and opposite side marginal edge portions of the fifth wheel plate.

Another object of this invention is to provide a seal attachment in accordance with the preceding object and which is readily adaptable for use on conventional fifth wheel plates.

Still another object of this invention is to provide a seal attachment including a seal element which will not be adversely affected by moisture and grease or oil.

A final object of this invention to be specifically enumerated herein is to provide a seal defining structure for a fifth wheel plate which will conform to conventional forms of manufacture, be of simple construction and easy to install on existing fifth wheel plates.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of a conventional form of fifth wheel plate to which the seal attachment of the instant invention has been secured;

FIG. 2 is a side elevational view of the assemblage illustrated in FIG. 1 with the fifth wheel plate operatively attached to a tractor frame or chassis;

FIG. 3 is an enlarged fragmentary vertical sectional view taken substantially upon the plane indicated by the section line 3—3 of FIG. 2;

FIG. 4 is a fragmentary sectional view similar to FIG. 3 but illustrating the manner in which the sealing strip of the attachment is deflected so as to be biased into fluid-tight sealed engagement with an associated kingpin plate; and FIG. 5 is a fragmentary vertical sectional view similar to FIG. 3 but illustrating a modified form of seal attachment.

Referring now more specifically to the drawings the numeral 10 generally designates a tractor chassis from which a conventional fifth wheel plate 12 is oscillatably supported by means of pivot shaft means 14. The fifth wheel plate 12 may be of any conventional construction including front and opposite side edges 16 and 18. As is conventional, the plate 12 includes a rearwardly opening slot 20 for the reception of the depending kingpin of an associated semi-trailer which is conventionally supported from a kingpin plate such as plate 22 of FIG. 4.

When a semi-trailer is operatively coupled to the fifth wheel plate 12, the plate 22 closely overlies the plate 12 and the opposing surface portions of the plates 12 and 22 define bearing surfaces. Further, lubricant such as heavy weight oil or grease is customarily utilized between these bearing surfaces to reduce friction therebetween and extend their bearing life.

However, in conventional fifth wheel plates no means is provided for establishing a weather-tight seal between these bearing surfaces and accordingly, moisture and dirt or other abrasive materials tend to gradually collect between these bearing surfaces and thus increase friction and shorten bearing surface life.

The attachment of the instant invention is referred to in general by the reference numeral 24 and comprises an elongated strip 26 of suitable waterproof and oil-resistant material such as neoprene. Additionally, the attachment 24 includes a thin metallic reinforcing and backing strip 28 which overlies one side surface of the strip 26. The strips 26 and 28 are provided with a plurality of pairs of aligned apertures or bores 30 and 32 and a plurality of headed fasteners 34 including threaded shank portions 36 have their shank portions passed through the pairs of aligned apertures 30 and 32 and threadedly engaged in blind threaded bores 38 formed in the edges 16 and 18 of the plate 12. In this manner, the strip 26 is secured to the edges 16 and 18 of the plate 12.

It may be seen from FIG. 3 of the drawings that the upper marginal edge portion of the strip 26 is beveled as at 40 and projects above the upper surface 42 of the plate 12. In this manner, with attention now invited more specifically to FIG. 4 of the drawings, when the plate 22 overlies the plate 12 the beveled upper marginal edge portion of the strip 26 is deflected outwardly so that the inherent resiliency of the strip 26 will bias the beveled upper marginal edge portion of the strip 26 into tight sealed engagement with the undersurface 44 of the plate 22.

In operation, as the tractor 10 is advanced rearwardly beneath the kingpin plate 22 of the associated trailer, the plate 22 rides over the upper surface 42 of the plate 12 and deflects the upper marginal edge portion of the strip 26 outwardly away from the inner end of the slot 20. The reinforcing or backing strip 28 serves a purpose which is believed to be obvious.

With attention now invited more specifically to FIG. 5 of the drawings there may be seen a modified form of attachment generally referred to by the reference numeral 24' and which is similar in many respects to the attachment 24. Accordingly, the components of the attachment 24' which are similar to the corresponding components of the attachment 24 are designated by prime reference numerals corresponding to those utilized in designating the components of the attachment 24. However, as may be observed from FIG. 5, the outer surface of the strip 26' has a groove 27 formed therein. The reinforcing strip 28' of the attachment 24' is fully seated within the groove 27 and its outer surface is flush with the outer surface of the strip 26'. In all other respects the attachment 24' is identical to the attachment 24.

As hereinbefore set forth, any suitable means may be utilized to secure a sealing strip such as strip 26 or 26' to the forward and opposite side peripheral portions of the fifth wheel plate 12, such as an upwardly opening groove formed in these peripheral portions in which a similar but vertically shorter sealing strip may be seated. Of course, if such a modified structure is utilized, the peripheral portions of the upper surface of the fifth wheel plate 12 disposed outwardly of the groove should be relieved at least slightly in order that the upper marginal edge portion of the sealing strip used in this alternate modified structure may be outwardly deflected in the manner in which the upper marginal edge portion of the strip 26 is outwardly deflected in FIG. 4 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a fifth wheel plate of the type including an upper bearing face, front and opposite side marginal edge portions and a rearwardly opening slot and adapted to be used in conjunction with a kingpin plate of the type including a lower bearing face downwardly from which a kingpin projects, said fifth wheel plate being adapted to have said kingpin plate disposed thereover with said faces in contact with each other and said pin rotatably and captively disposed in the inner forward end of said slot, said fifth wheel plate including an elongated strap of flexible and resilient water-impervious material, said strap being supported from said fifth wheel plate in edge upstanding relation with the upper longitudinal edge portion of said strap projecting slightly above said upper bearing face and with said strap extending along said front and opposite side marginal edge portions of said fifth wheel plate.

2. The combination of claim 1 wherein said strap is continuous from one end thereof to the other.

3. The combination of claim 1 wherein said strap is constructed of neoprene.

4. The combination of claim 1 wherein said fifth wheel plate includes continuous arcuate front and opposite side edge faces, said strap being secured to said fifth wheel plate in overlying engagement with said edge faces.

5. The combination of claim 4 including fasteners secured through said strap and anchored in said front and opposite side marginal edge portions of said fifth wheel plate.

6. The combination of claim 5 including a reinforcing band of metal disposed over the outer face of said strap and spaced below the upper marginal edge of said strap, said fasteners also being secured through said band.

7. The combination of claim 6 wherein said outer face of said strap comprises the bottom face of an outwardly opening groove formed in said strap in which said band is at least slightly recessed.

8. The combination of claim 1 wherein the upper marginal edge portion of said strap is beveled upwardly toward its outer surface.

References Cited
UNITED STATES PATENTS

| | | | |
|---|---|---|---|
| 2,514,034 | 7/1950 | Dean | 105—199 |
| 2,662,799 | 12/1953 | Schaefer | 308—136 |
| 2,665,177 | 1/1954 | Schaefer | 308—136 |
| 3,091,501 | 5/1963 | Satrum | 280—433 X |
| 3,174,812 | 3/1965 | Widmer | 308—136 |
| 3,370,866 | 2/1968 | Mitchell et al. | 308—136 X |

LEO FRIAGLIA, Primary Examiner

U.S. Cl. X.R.

308—136